METHOD OF RECORDING OR REPRODUCING PREARRANGED SEQUENCES OF PULSES

Filed Nov. 7, 1958

INVENTOR.
EUSTACE E. SUCKLING
BY P. E. Henninger
ATTORNEY

United States Patent Office 2,964,375
Patented Dec. 13, 1960

2,964,375

METHOD OF RECORDING OR REPRODUCING PREARRANGED SEQUENCES OF PULSES

Eustace Edgar Suckling, 21 Bellair Drive, Dobbs Ferry, N.Y.

Filed Nov. 7, 1958, Ser. No. 772,512

7 Claims. (Cl. 346—74)

Figures 1, 1A, 1B, 1C:
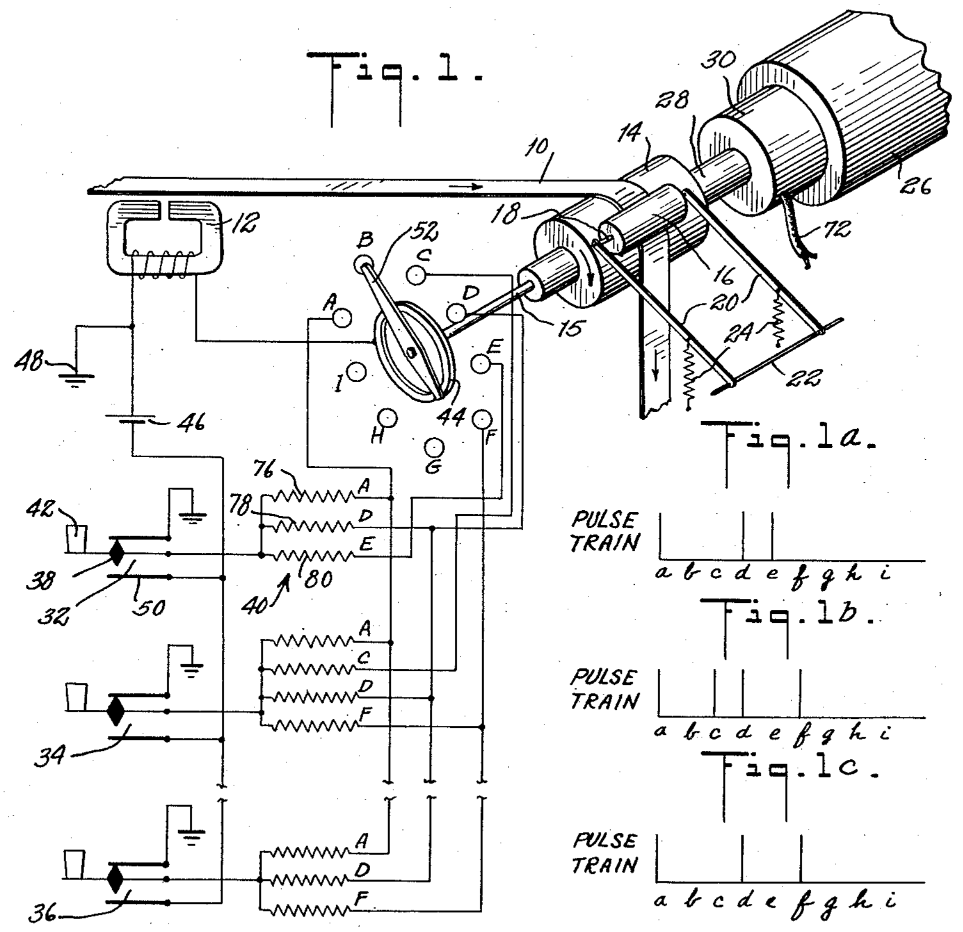

This invention relates to apparatus for producing records on magnetic tape. More particularly, the invention pertains to key controlled apparatus for recording pulse trains of prearranged configurations on magnetic tape.

In a number of areas of the electronic art, such as function generation and machine or process control, it is necessary to provide trains of pulses whereof the number of pulses, the intervals between the pulses and the polarity of individual pulses follow a specific pattern.

The pattern or configuration of pulses is ordinarily precomputed or determined by experimentation for a particular control function or series of control functions. Frequently, it is necessary, or at least desirable, to have a number of pulse patterns readily available so that a corresponding number of different sequences of action of the controlled instrument can be set up at will.

For example, in the generation of a mathematical function, the individual positive pulses can each perform an action of triggering into existence a line segment of a certain slope, while negative pulses trigger a corresponding line segment of a similar but negative slope such that, as the segments follow one another, functions are generated whose general shape responds to the sequence of positive and negative pulses. If the segments are of short duration, approximations to functions of a wide variety can be obtained. The principle of adding line segments to obtain functions, well known in the field of analogue computer design, is but a single example of the wide application of pulse trains for control purposes.

For some purposes, it may be necessary to set up a number of commonly used functions very quickly, and for this purpose, information in some form must be stored in a permanent manner. The stored information must be quickly available and must be capable of dictating to the machine being controlled, the particular sequence of pulses needed for producing a desired result.

An application of the principle is illustrated in my Patent 2,781,508, granted February 12, 1957, which discloses an intelligence transmission system in which a sequence of pulses generate a function which when displayed on an oscilloscope is recognizable as a symbol or a letter of the alphabet.

The present methods for achieving the results described are complex and expensive and involve information storage and read-out devices which have been developed for other special purposes.

It is the object of this invention to provide an extremely inexpensive, simple and robust method and apparatus for recording and storing binary data which, although not easily alterable, is permanently available for rapid read-out when the occasion requires.

Figure 2:
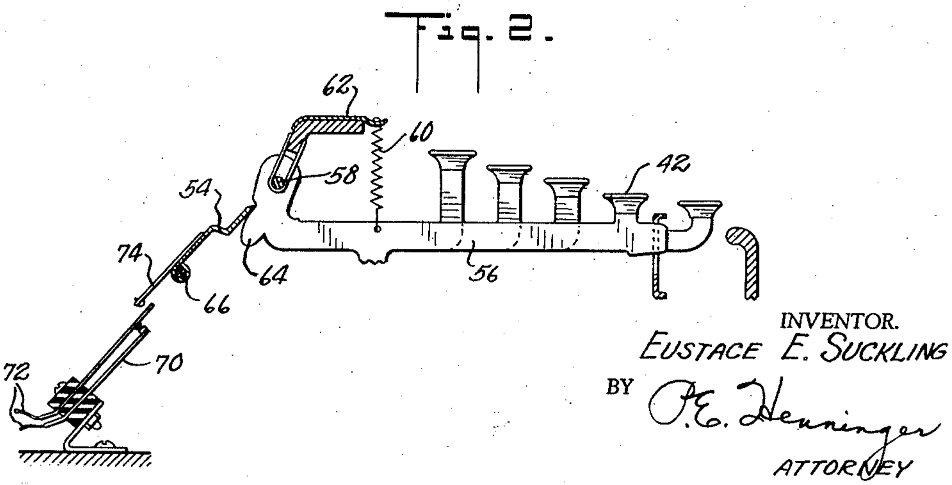

The features of the invention will be more fully developed in connection with the drawing forming a part of this application in which drawing:

Fig. 1 is a schematic diagram of tape transport mechanism and associated magnetic recording circuits;

Fig. 1*a* through 1*c* each represent a different pulse trained configuration recorded on magnetic tape; and Fig. 2 is a sectional illustration through a simple keyboard adapted to close a circuit upon operation of any one of its keys.

Reverting specifically to the drawing, a magnetic tape 10 is supported in any suitable manner for movement in recording proximity to a magnetic recording head 12. The magnetic tape 10 lies in contact with a tape driving capstan 14, and is held in driving contact therewith by a pinch roller 16. The pinch roller 16 is mounted for rotation by its axial bearings 18 in a frame 20 which is supported on a pivot axis 22 and is biased into contact with the tape driving capstan 14 by means of a pair of springs 24.

As the description of the invention proceeds, it will be seen that the magnetic tape 10 is to be driven intermittently in synchronization with an output signal contact sampling device. Accordingly, there is provided a motor 26 which may be constantly energized and which is coupled to the tape driving capstan 14 by means of a shaft 28. Between the motor 26 and the shaft 28 is interposed a single revolution clutch 30. This clutch may be of any suitable design such as, for example, the clutch mechanism shown in the Kurt R. Schneider Patent 2,206,646, granted July 2, 1940. The clutch of the aforesaid patent is magnetically controlled such that upon each energization of the clutch, it is operated for a single revolution and is then automatically disconnected.

The mechanism herein includes a plurality of signal output points identified by the letters A through I. A plurality of normally open switches 32, 34 and 36 are electrically connected to predetermined combinations of the signal output points A through I. The number of output points herein and the number of switches connected thereto has been arbitrarily selected for the purpose of illustration only, it being appreciated that a greater or lesser number of each may be employed. A movable blade 38 of the normally open switches 32—36 is connected by way of resistances 40 to any desired number or combination of the signal output points A through I. Thus, in Fig. 1, it will be seen that the switch 32 is connected to the signal output points A, D and E, the switch 34 is connected by way of resistances to the signal output points A, C, D and F, while the switch 36 is connected by way of resistances to the signal output points A, D and F.

Normally, the movable blade of the switches 32—36 is connected to ground. However, when an operating key 42 of any of the switches is depressed, a circuit will be completed to the magnetic recording head 12. The winding of the recording head 12 is connected at one end to a commutator ring 44 and at the other end to a source of potential 46 which has a ground connection 48. Each of the switches 32—36 is connected to the other side of the power source 46 by means of a contact 50. The contacts 50 are so positioned that whenever a key 42 related thereto is depressed, the moving contact 38 will complete a circuit from the power source 46 through the lower contact 50 of the depressed key, through its associated resistances 40 and to the signal outlet points A through I to which the particular key is connected.

Whenever a key 42 is depressed to complete a circuit to a predetermined number of signal outlet points A through I, the potential on the connected points can be sampled by means of a brush 52. As shown in Fig. 1, the brush 52 is adapted to rotate in contact with the commutator ring 44, which ring, as stated, is connected in the circuit of the magnetic recording head 12. Consequently, when the brush 52 is rotated from one of the signal output points to another, a recording potential will be transmitted to the recording head 12 at each point which is connected into the closed switch.

It has been stated above that the tape driving capstan 14 is adapted to operate in synchronism with the output signal sampling brush 52, and in order to provide for the synchronous rotation of the tape drive capstan 14 and the output signal sampling brush 52, the brush 52 is mounted on an extension 15 of the tape driving capstan shaft 28. Thus, when the one revolution clutch 30 is energized and the tape driving capstan 14 operates through its revolution, the output signal sampling brush 52 is also rotated to sweep in succession the signal output points A through I.

Any suitable means may be provided for supplying energizing pulses to the one revolution clutch 30. A convenient method for energizing the clutch is shown in Fig. 2. Since it is desired to energize the clutch 30 upon the depression of any one of the keys 42, the mechanism of Fig. 2 provides a simple means for transmitting the mechanical motion of the keys 42, as an electric pulse to the magnetic clutch 30. It is common in the art of typewriters to provide a universal bar which is oscillated when any of the typewriter keys are depressed. Resort may, therefore, be had to the typewriter art for the circuit closing mechanism of Fig. 2 which contains a universal bar 54 of the kind shown in the C. T. Jackson Patent 2,439,470, issued April 13, 1948.

By reference to Fig. 2, it will be seen that the keys 42 may be mounted on a key lever 56 which is pivoted on a pivot bar 58. The key levers 56 are ordinarily held in their elevated position by means of springs 60 connecting each key lever to a bracket structure 62 which is positioned above and overlies the pivot end of the key levers. Each key lever is formed with a downwardly projecting extension 64, these extensions being arranged in alignment transversely of the keyboard. The universal bar 54 is mounted to rock about a pivot shaft 66 and its upwardly extending free edge is adapted to abut the extension 64 of the key levers. It can be seen, therefore, that as any one of the key levers 56 is depressed, the extension 64 thereof will rock the universal bar 54 in a counterclockwise direction about its pivot 66. This movement can be usefully employed to operate a spring contact 70, at the end of a pair of conductors 72 which constitute the control circuit for the one revolution clutch 30. Conveniently, the universal bar 54 may have attached thereto a downwardly extending operating finger 74 which is in juxtaposition to the upper blade of the spring contact 70, such that when the universal bar 54 is rocked about its pivot 66, the extension 74 will close the spring contact 70 and thereby complete a circuit to the one revolution clutch 30.

With the foregoing structure and circuit in mind, let it be assumed that the switch 32 is closed by depressing its key 42. This places voltage on the resistors 76, 78 and 80 and through them to the signal output contacts A, D and E, respectively. Depression of the key 42 will rock the universal bar 54 and thereby close the spring contact 70 with the result that the one revolution clutch 30 is energized. Energization of the clutch 30 will result in a single revolution of the tape driving capstan 14 and the output signal sampling brush 52. It is assumed that the home position of the brush 52 is just short, in a counterclockwise direction, of the signal output point A. Therefore, as the brush 52 rotates in a clockwise direction, it will make contact successively with the points A, B, C, D, etc. with the result that a signal will be recorded on the tape whenever the brush 52 makes contact with a point which is in the circuit of the switch 32. In the particular example, a signal will be recorded when the brush 52 makes contact with the signal output points A, D and E, resulting in a pulse train having the configuration shown in Fig. 1*a*. When the switch 34 is closed and a recording cycle ensues a pulse train, such as that shown in Fig. 1*b*, will be recorded since, as in the example given, this switch 34 is connected to the output points A, C, D and F. By the same token, when the switch 36 is closed, a pulse train, such as that shown in Fig. 1*c*, results since this latter switch is connected into signal output points A, D and F.

In actual practice, one or more of the switches may be connected with a great number of signal output points with the result that a larger bank of resistors would be connected thereto. All except one of these resistors may be connected back to ground through other open switches to which they are also connected and as a consequence the voltage on the signal output stud will be decreased. Should there be a decrease in voltage by reason of the foregoing to a point less than desirable for an efficient operation, a number of methods familiar to the art can be used to maintain the desired voltage level. For example, the recording head 12 may be operated from a condenser pulse released through a thyratron circuit. The circuit can be designed so that a thyratron is triggered from even the least voltage encountered on any one of the signal output points.

If the pulses of positive or negative polarity are produced selectively, a second winding or a center tapped winding can be employed on the recording head 12. In such case, the winding can be operated from a second bank of signal output points, the studs of which are connected via resistors to the switches, as shown.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a magnetic recording system, a plurality of equally spaced signal output points, a plurality of normally open switches electrically connected to predetermined combinations of said signal output points, means grounding each of said switches when open, means for sampling in sequence each of said output points, a magnetic recording head having an electrical connection with said output point sampling means and with each of said switches, and means synchronized with said sampling means for moving a magnetic tape in recording proximity to said magnetic recording head a predetermined distance during each output point sampling cycle.

2. In a magnetic recording system, a plurality of equally spaced signal output points, a plurality of normally open switches electrically connected to predetermined combinations of said signal output points, means grounding each of said switches when open, means for sampling in sequence each of said output points, a magnetic recording head having an electrical connection with said output point sampling means and with each of said switches, means synchronized with said sampling means for moving a magnetic tape in recording proximity to said magnetic recording head a predetermined distance during each output point sampling cycle, and means responsive to closure of any one of said switches for causing operation of said output point sampling means.

3. In a magnetic recording system, a plurality of equally spaced signal output points, a plurality of normally open switches electrically connected to predetermined combinations of said signal output points, means grounding each of said switches when open, means for sampling in sequence each of said output points, a magnetic recording head having an electrical connection with said output point sampling means and with each of said switches, a drive capstan synchronized with said sampling means for moving a magnetic tape in recording proximity to said magnetic recording head during each output point sampling cycle, means responsive to closure of any one of said switches for causing operation of said output point sampling means, and means also responsive to the closure of any one of said switches for simultaneously operating said drive capstan for moving the magnetic tape a predetermined distance.

4. In a magnetic recording system, a plurality of equally spaced signal output points, a plurality of normally open switches electrically connected to predetermined combinations of said signal output points, means grounding each of said switches when open, rotary means for sampling in sequence each of said output points, a magnetic recording head having an electrical connection with said output point sampling means and with each of said switches, and means operating in synchronism with said rotary sampling means for moving a magnetic tape in recording proximity to said magnetic recording head a predetermined distance during each output point sampling cycle.

5. In a magnetic recording system, a plurality of equally spaced signal output points, a plurality of normally open switches electrically connected to predetermined combinations of said signal output points, means grounding each of said switches when open, rotary means for sampling in sequence each of said output points, a single revolution clutch for rotating said sampling means, a magnetic recording head having an electrical connection with said output point sampling means and with each of said switches, and means connected to said clutch and operative in synchronism with said rotary sampling means for moving a magnetic tape in recording proximity to said magnetic recording head a predetermined distance during each output point sampling cycle.

6. In a magnetic recording system, a plurality of equally spaced signal output points, a plurality of normally open switches electrically connected to predetermined combinations of said signal output points, means grounding each of said switches when open, rotary means for sampling in sequence each of said output points, a magnetic recording head having an electrical connection with said output point sampling means and with each of said switches, rotary tape drive capstan for moving a magnetic tape in recording proximity to said magnetic recording head a predetermined distance during each output point sampling cycle, and a one revolution clutch for simultaneously controlling said sampling means and said tape drive capstan.

7. In a magnetic recording system, a plurality of equally spaced signal output points, a plurality of normally open switches electrically connected to predetermined combinations of said signal output points, means grounding each of said switches when open, a manual key for closing each of said switches, rotary means for sampling in sequence each of said output points, a magnetic recording head having an electrical connection with said output point sampling means and with each of said switches, rotary tape drive means arranged for operation in synchronism with said rotary sampling means for moving a magnetic tape in recording proximity to said magnetic recording head a predetermined distance during each output point sampling cycle, and a one revolution clutch responsive to the operation of any one of said keys for simultaneously controlling said sampling means and said rotary tape drive means.

References Cited in the file of this patent

UNITED STATES PATENTS

| | | |
|---|---|---|
| 1,881,622 | Janson et al. | Oct. 11 1932 |
| 2,672,395 | Lewis | Mar. 16, 1954 |
| 2,833,859 | Rahmel et al. | May 6, 1958 |
| 2,838,603 | Hudec | June 10, 1958 |
| 2,841,461 | Gleason | July 1, 1958 |